US011862846B2

(12) United States Patent
Shimura et al.

(10) Patent No.: US 11,862,846 B2
(45) Date of Patent: Jan. 2, 2024

(54) ANTENNA MODULE AND VEHICLE

(71) Applicant: Sumitomo Electric Industries, Ltd., Osaka (JP)

(72) Inventors: Tatsuhiro Shimura, Osaka (JP); Isao Katsura, Osaka (JP); Masahiko Onishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 373 days.

(21) Appl. No.: 17/284,803

(22) PCT Filed: Jul. 8, 2019

(86) PCT No.: PCT/JP2019/027004
§ 371 (c)(1),
(2) Date: Apr. 13, 2021

(87) PCT Pub. No.: WO2020/084841
PCT Pub. Date: Apr. 30, 2020

(65) Prior Publication Data
US 2022/0006178 A1 Jan. 6, 2022

(30) Foreign Application Priority Data
Oct. 24, 2018 (JP) ................................. 2018-199742

(51) Int. Cl.

| | |
|---|---|
| ***H01Q 1/42*** | (2006.01) |
| ***H01Q 1/32*** | (2006.01) |
| ***H01Q 19/10*** | (2006.01) |
| ***H01Q 21/06*** | (2006.01) |
| ***H01Q 21/28*** | (2006.01) |

(52) U.S. Cl.
CPC ......... *H01Q 1/3275* (2013.01); *H01Q 1/3291* (2013.01); *H01Q 1/42* (2013.01); *H01Q 19/104* (2013.01); *H01Q 21/061* (2013.01); *H01Q 21/28* (2013.01)

(58) Field of Classification Search
CPC .... H01Q 21/28; H01Q 21/061; H01Q 19/104; H01Q 1/42; H01Q 1/3291; H01Q 1/3275
See application file for complete search history.

(56) References Cited

U.S. PATENT DOCUMENTS

| | | | | |
|---|---|---|---|---|
| 2010/0218224 | A1 | 8/2010 | Gat et al. | |
| 2017/0187101 | A1 | 6/2017 | Freeman et al. | |
| 2018/0138591 | A1* | 5/2018 | Kim ....................... | H01Q 1/325 |
| 2019/0051977 | A1 | 2/2019 | Kawaguchi et al. | |

FOREIGN PATENT DOCUMENTS

| | | | |
|---|---|---|---|
| JP | 2003-309410 | A | 10/2003 |
| JP | 2005-051338 | A | 2/2005 |
| JP | 2009-105613 | A | 5/2009 |
| JP | 2017-152850 | A | 8/2017 |
| WO | 2018/088051 | A1 | 5/2018 |

* cited by examiner

*Primary Examiner* — Graham P Smith
(74) *Attorney, Agent, or Firm* — McCarter & English, LLP; Michael A. Sartori

(57) ABSTRACT

An antenna module to be provided to a vehicle includes: an array antenna configured to form a beam directed from an aperture provided in an exterior body panel of the vehicle, toward a vehicle outside; and a housing holding the array antenna in a vehicle inside.

10 Claims, 15 Drawing Sheets

ANTENNA MODULE AND VEHICLE

TECHNICAL FIELD

The present disclosure relates to an antenna module and a vehicle.

This application claims priority on Japanese Patent Application No. 2018-199742 filed on Oct. 24, 2018, the entire content of which is incorporated herein by reference.

BACKGROUND ART

PATENT LITERATURE 1 discloses an on-vehicle mobile station capable of wireless communication by a mobile communication system.

CITATION LIST

Patent Literature

PATENT LITERATURE 1: International Publication No. WO2018/088051

SUMMARY OF INVENTION

An antenna module according to an embodiment is an antenna module to be provided to a vehicle, the antenna module including: an array antenna configured to form a beam directed from an aperture provided in an exterior body panel of the vehicle, toward a vehicle outside; and a housing holding the array antenna in a vehicle inside.

A vehicle according to another embodiment is a vehicle including the above antenna module.

DESCRIPTION OF EMBODIMENTS

Figure 1:
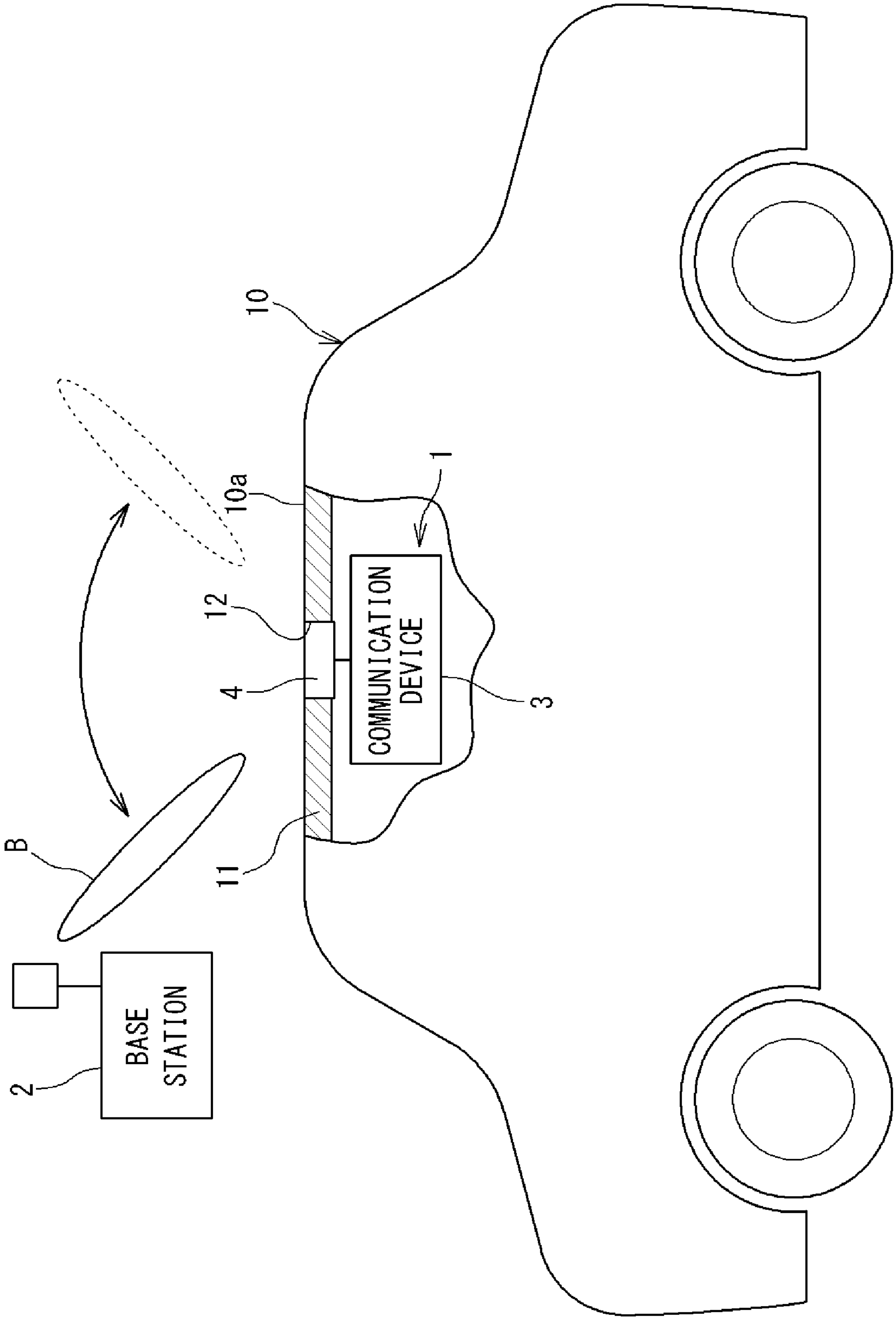
FIG. 1 is a diagram showing a vehicle on which an on-vehicle communication apparatus is mounted.

Problems to be Solved by the Present Disclosure

The above on-vehicle mobile station includes an antenna device (antenna module) mounted at the ceiling (roof) of a vehicle. The antenna device forms an array antenna including a large number of antenna elements, and can form a beam toward a base station.

Here, since the antenna device of the on-vehicle mobile station is mounted at the outer surface of the roof or the like of the vehicle, the height of the antenna relative to the outer surface of the vehicle is required to be reduced from the viewpoint of vehicle design and vehicle height limit.

The present disclosure has been made in view of such circumstances, and an object of the present disclosure is to provide an antenna module capable of reducing its height relative to the outer surface of a vehicle, and a vehicle.

Effects of the Present Disclosure

According to the present disclosure, the height relative to the outer surface of the vehicle can be reduced.

First, contents of embodiments are listed and described.

Summary of Embodiments (1) An antenna module according to an embodiment is an antenna module to be provided to a vehicle, the antenna module including: an array antenna configured to form a beam directed from an aperture provided in an exterior body panel of the vehicle, toward a vehicle outside; and a housing holding the array antenna in a vehicle inside.

In the antenna module having the above configuration, since the array antenna configured to form a beam directed toward the vehicle outside is held in the vehicle inside, the height of the array antenna relative to the outer surface of the vehicle can be reduced.

(2) When radio waves radiated from the array antenna pass through the vicinity of a metal plate, the energy of the radio waves may be impaired by the metal plate, and the beam formed by the array antenna may become deformed, which may cause a decrease in gain.

Therefore, in the antenna module, preferably, the exterior body panel includes a metal plate, the antenna module further includes a control unit configured to control an orientation direction of the beam such that the orientation direction of the beam is directed toward a base station that is a transmission source of a reception wave received by the array antenna, and the control unit corrects the orientation direction of the beam in accordance with a crossing angle between an arrival direction of the reception wave and an aperture plane of the aperture.

In this case, even when the crossing angle of the reception wave becomes smaller, resulting in the crossing angle between the orientation direction of the beam and the aperture plane becoming smaller and the beam approaching the metal outer plate so that the beam becomes deformed, the orientation direction of the beam can be corrected so as to compensate for the deformation of the beam, whereby a decrease in gain can be inhibited (3) When transmission waves radiated from the array antenna are radiated to the inner end of the aperture of the exterior body panel, the transmission waves may be reflected in an unintended direction such as to the inside of the housing, and the beam may become deformed, which may cause a decrease in gain.

Therefore, the antenna module may further include a guide portion provided at an inner end of the aperture and configured to, when a transmission wave radiated from the array antenna is incident thereon, radiate the incident transmission wave toward the vehicle outside.

In this case, the transmission waves that may be radiated to the inner end of the aperture and radiated in an unintended direction can be radiated to the vehicle outside by the guide portion. As a result, the beam can be inhibited from being deformed.

(4) (5) In the antenna module, the guide portion may be a reflection element configured to reflect the incident transmission wave toward the vehicle outside, or may be a metamaterial configured to radiate the incident transmission wave toward the vehicle outside.

In this case, the transmission wave radiated toward the inner end of the aperture can be effectively radiated to the vehicle outside.

(6) In the antenna module, preferably, the housing includes: a bottom portion to which the array antenna is fixed; and a cylindrical side wall portion erected from the bottom portion, a fixing sleeve to which the housing is inserted and fixed is provided at the exterior body panel, and a fixing mechanism for fixing the housing to the fixing sleeve is provided at the side wall portion.

In this case, the housing can be easily fixed to the exterior body panel with a simple configuration.

(7) In the antenna module, preferably, an annular flange portion extending radially outward and coming into contact with the exterior body panel from the outside of the vehicle is provided at an end of the side wall portion, and the flange portion is flush with an outer surface of the exterior body panel.

(8) A vehicle according to another embodiment is a vehicle including the antenna module according to any one of the above (1) to (7).

According to this configuration, the vehicle can be used as a mobile station.

(9) In the vehicle, in the case where the exterior body panel includes a metal plate, the vehicle preferably further includes a shielding portion provided so as to cover a periphery of the aperture in the outer surface of the exterior body panel and configured to shield a radio wave radiated from the array antenna and the exterior body panel from each other.

In this case, when radio waves pass through the vicinity of the outer surface of the exterior body panel, the radio waves and the exterior body panel are shielded from each other by the shielding portion, and the energy of the radio waves can be inhibited from being impaired, so that the beam can be inhibited from being deformed.

(10) (11) In the vehicle, the shielding portion may be a radio absorbent material covering the outer surface, or may be an electrical insulator covering the outer surface.

In this case, the radio wave and the exterior body panel can be effectively shielded from each other.

Details of Embodiments

Hereinafter, preferred embodiments will be described with reference to the drawings.

At least some parts of the embodiments described below may be combined together as desired.

FIG. 1 is a view showing a vehicle on which an on-vehicle communication apparatus is mounted.

In FIG. 1, an on-vehicle communication apparatus 1 is mounted on a vehicle 10. The on-vehicle communication apparatus 1 is a mobile station which performs wireless communication with a base station 2 of a mobile communication system. Examples of the vehicle 10 include an ordinary passenger vehicle as well as a bus, a railroad vehicle, etc.

The base station 2 is provided at a relatively high location such as the rooftop of a building, and performs wireless communication with the on-vehicle communication apparatus 1 on the ground.

The wireless communication performed between the on-vehicle communication apparatus 1 and the base station 2 is, for example, wireless communication compliant with a 5th-generation mobile communication system.

In the 5th-generation mobile communication system, for example, radio waves having a very high frequency of 6 GHz or higher are used, and thus attenuation during propagation is great. Accordingly, the on-vehicle communication apparatus 1 and the base station 2 perform beamforming in order to compensate for attenuation of the radio waves. The on-vehicle communication apparatus 1 can perform control such that the direction of a beam B is directed toward the base station 2.

The on-vehicle communication apparatus 1, which is mounted on the vehicle 10, includes a communication device 3 and an antenna module 4. The communication device 3 performs wireless communication with the base station 2 by using the antenna module 4. In addition, the communication device 3 performs communication via a wireless LAN or the like with a mobile terminal (not shown) such as a smartphone present in the vehicle 10. The communication device 3 has a function of relaying communication between such a mobile terminal in the vehicle 10 and the base station 2.

The communication device 3 provides a transmission baseband signal to the antenna module 4. In addition, the communication device 3 receives a reception baseband signal provided from the antenna module 4.

The antenna module 4 is connected to the communication device 3, and the antenna module 4 modulates the transmission baseband signal provided from the communication device 3, into an RF signal, performs signal processing such as phase control and amplification on the RF signal, and wirelessly transmits an RF signal resulting from the signal processing. In addition, the antenna module 4 receives radio waves transmitted from the base station 2, to obtain an RF signal. Then, the antenna module 4 performs signal processing such as modulation, amplification, and phase control on the RF signal, and provides a reception baseband signal resulting from the signal processing, to the communication device 3.

Furthermore, the antenna module 4 has a function of controlling the direction of the beam B (orientation direction of the antenna module 4).

That is, the antenna module 4 forms a front-end module in the on-vehicle communication apparatus 1.

The antenna module 4 is attached to, for example, an aperture 12 provided in an exterior body panel 11 that forms the roof of the vehicle 10, for transmission and reception of RF signals. The antenna module 4 is attached so as to be embedded such that the antenna module 4 is almost flush with the surface of the exterior body panel 11.

Antenna Module According to First Embodiment

Figure 2:
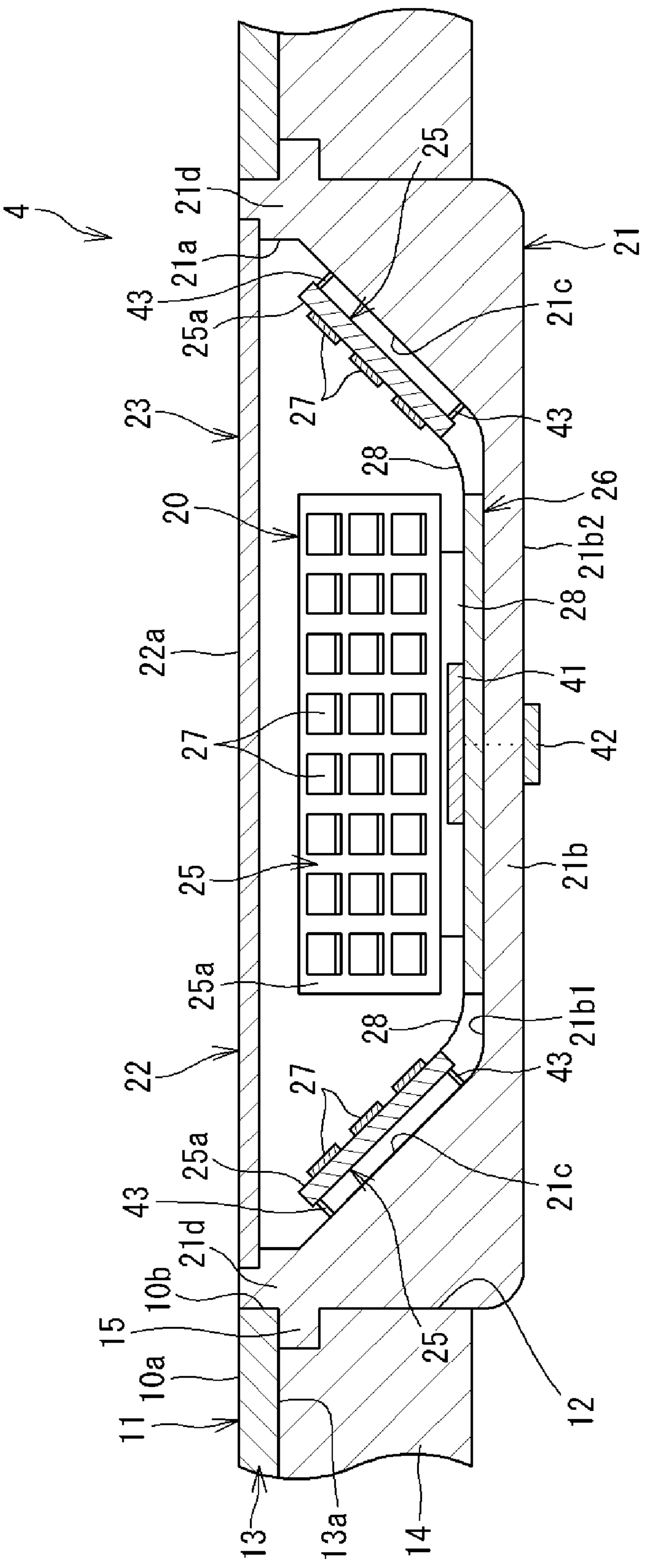
FIG. 2 is a cross-sectional view of an antenna module according to a first embodiment.

FIG. 2 is a cross-sectional view of an antenna module 4 according to a first embodiment.

In FIG. 2, the antenna module 4 includes a module body 20, a housing 21 in which the module body 20 is housed, and a radome 22.

The exterior body panel 11, at which the antenna module 4 is attached, includes a metal outer plate (metal plate) 13 that forms an outer surface 10*a* of the vehicle 10, and a lining material 14 that is made of a soundproof material or the like and laminated inside the outer plate 13. Thus, the outer surface of the outer plate 13 is the outer surface 10*a* of the vehicle 10. The outer plate 13 is, for example, a steel plate.

The housing 21 is a member made of resin or the like, and is formed in a rectangular box shape having a rectangular aperture 21*a* in one surface thereof. The housing 21 is attached to the aperture 12 of the exterior body panel 11 such that the aperture 21*a* is open on a vehicle outside.

As for the size of the housing 21, for example, the plane dimension is about 100 mm to 200 mm, and the height dimension is about several tens of millimeters.

A projection 15 is formed on the side surface of the housing 21 so as to project from the side surface. The projection 15 positions the housing 21 relative to the exterior body panel 11 by coming into contact with an inner surface 13*a* of the outer plate 13. In addition, the projection 15 is located between the outer plate 13 and the lining material 14 and fixes the housing 21 to the exterior body panel 11.

The radome 22 is a rectangular plate-shaped member made of resin or the like, and closes the aperture 21*a* of the housing 21.

The radome 22 protects the module body 20 from the outside while allowing radio waves transmitted/received by the module body 20 to pass therethrough.

The radome 22 is disposed at an aperture plane 23 defined by the aperture 21*a*.

The peripheral edge of the radome 22 is fixed to an end edge portion 21*d* of the housing 21. The end edge portion 21*d* holds the radome 22 such that the radome 22 is attached and fixed at the aperture plane 23.

A surface 22*a* of the radome 22 is formed to be almost flush with the surface of the exterior body panel 11.

Here, being flush refers to substantially being flush, and includes, for example, the case where the radome 22 has a curved surface slightly protruding relative to a curved surface along the surface shape of the exterior body panel 11, and the case where the radome 22 slightly protrudes or dents from the surface of the exterior body panel 11 depending on the attachment method, the manufacturing method for each part, or the like.

Figure 3:
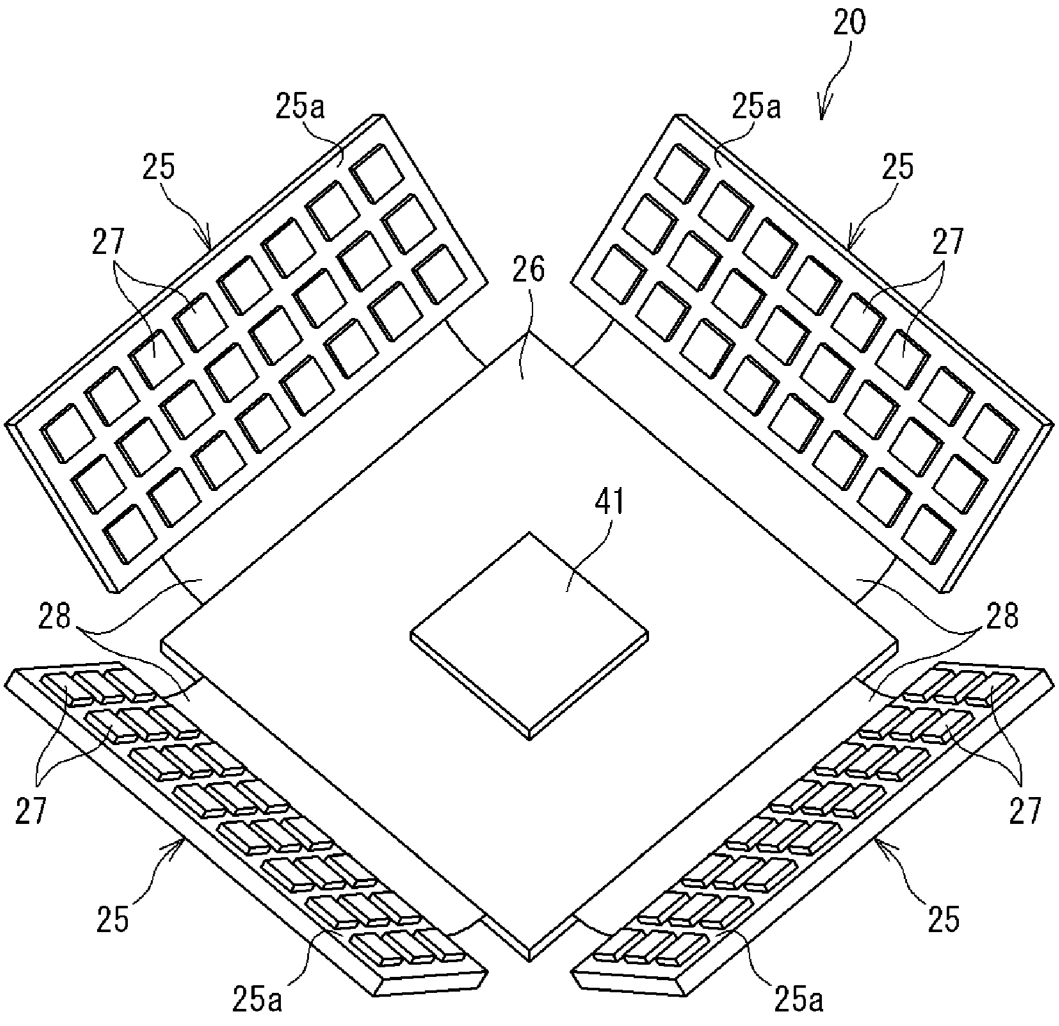
FIG. 3 is a perspective view showing a module body.

FIG. 3 is a perspective view showing the module body 20.

As shown in FIG. 2 and FIG. 3, the module body 20 includes four antenna bases 25 and a circuit substrate 26.

Each antenna base 25 is formed in a rectangular plate shape by laminating electrical insulators such as glass fabric base epoxy resin material, for example. A plurality of radiating elements 27 are provided on a radiation surface 25*a* of the antenna base 25. Each radiating element 27 is, for example, a planar antenna.

Each of the antenna bases 25 forms an array antenna by the plurality of radiating elements 27, and is capable of beamforming individually.

Each antenna base 25, which is an array antenna, forms a beam directed from the aperture 12, which is provided in the exterior body panel 11, toward the outside of the vehicle 10.

The antenna base 25 is held in a vehicle inside by the housing 21.

Therefore, the antenna module 4 according to the present embodiment allows the height of the antenna base 25 relative to the outer surface 10*a* of the vehicle 10 to be reduced.

The vehicle inside means an inner side with respect to the outer surface 10*a*, of the vehicle 10, which is formed by the outer plate 13, and the vehicle outside means an outer side with respect to the outer surface 10*a*.

The four antenna bases 25 are connected to the circuit substrate 26 via band-like flexible substrates 28.

Each flexible substrate 28 is formed, for example, by a dielectric film that has flexibility and is deformable to be bent (flexed).

Figure 4:
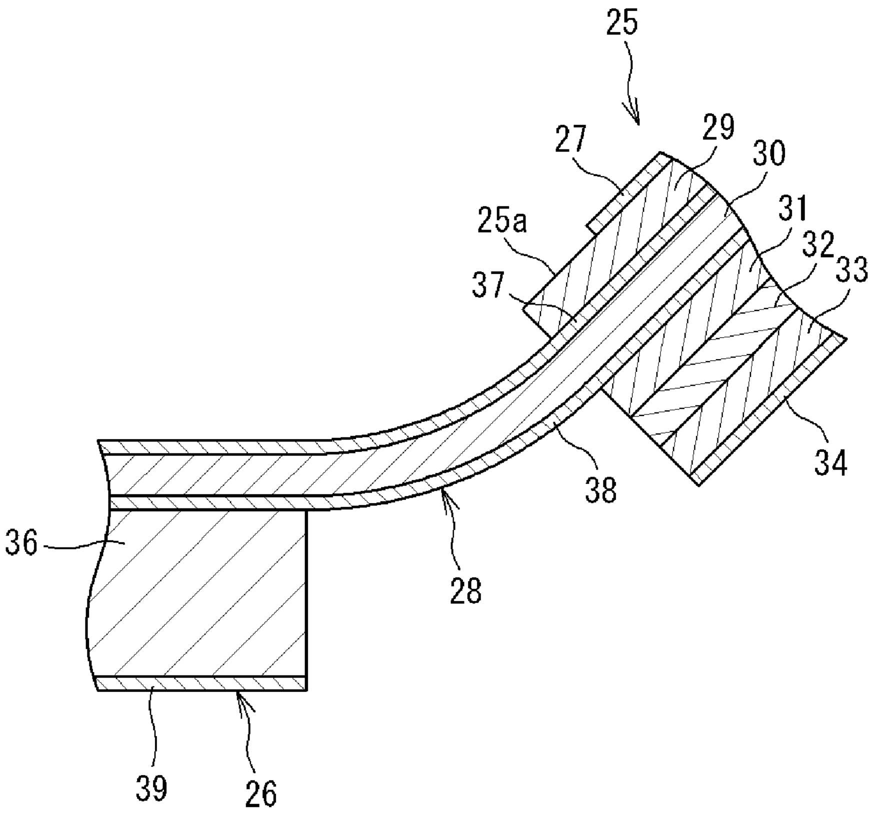
FIG. 4 is a cross-sectional view of a flexible substrate.

FIG. 4 is a cross-sectional view of the flexible substrate 28.

As shown in FIG. 4, the antenna base 25 includes a first dielectric layer 29, a second dielectric layer 30, a third dielectric layer 31, a fourth dielectric layer 32, and a fifth dielectric layer 33. The radiating elements 27 are mounted on the first dielectric layer 29 having a surface that forms the radiation surface 25*a*, of the dielectric layers.

The second dielectric layer 30 protrudes from an end surface of the antenna base 25 and extends toward the circuit substrate 26 side. The flexible substrate 28 is composed of the part of the second dielectric layer 30 that extends from the end surface of the antenna base 25 toward the circuit substrate 26 side. That is, the flexible substrate 28 is formed so as to be integrated with the second dielectric layer 30.

Here, while the first dielectric layer 29, the third dielectric layer 31, the fourth dielectric layer 32, and the fifth dielectric layer 33 are formed of an electrical insulator such as glass fabric base epoxy resin material, the second dielectric layer 30 is formed of a dielectric film. Thus, the flexible substrate 28 is formed of the dielectric film.

The flexible substrate 28 is laminated on a dielectric layer 36 of the circuit substrate 26 and forms a part of layers of the circuit substrate 26. Thus, the flexible substrate 28 is formed so as to be integrated with the circuit substrate 26.

Thus, the flexible substrate 28 is formed so as to be integrated with the antenna base 25 and the circuit substrate 26, and connects the antenna base 25 and the circuit substrate 26.

A power feed line 37 made of a conductor is formed between the first dielectric layer 29 and the second dielectric layer 30.

The power feed line 37 is a line for feeding power to each radiating element 27. In FIG. 4, a cross section of one power feed line 37 is shown, but, in the flexible substrate 28, a plurality of power feed lines 37 are formed correspondingly for the radiating elements 27 provided on the antenna base 25.

The power feed line 37 is connected to the radiating element 27 via a through hole or the like (not shown). The power feed line 37 is formed so as to extend from the antenna base 25 via the flexible substrate 28 to the circuit substrate 26.

Moreover, a ground pattern 38 made of a conductor is provided between the second dielectric layer 30 and the third dielectric layer 31. The ground pattern 38 is also formed so as to extend from the antenna base 25 via the flexible substrate 28 to the circuit substrate 26.

The ground pattern 38 is connected to a ground pattern 34 of the antenna base 25 via a through hole or the like (not shown). In addition, the ground pattern 38 is connected to a ground pattern 39 formed at the dielectric layer 36 of the circuit substrate 26, via a through hole or the like (not shown).

The ground pattern 38 is provided so as to be opposed to the power feed line 37, over the antenna base 25, the flexible substrate 28, and the circuit substrate 26. Accordingly, the power feed line 37 serves as a microstrip line. In FIG. 2 and FIG. 3, the power feed line 37 is not shown.

The flexible substrate 28 connects the antenna base 25 and the circuit substrate 26 so as to allow power feeding therebetween by the power feed line 37.

As shown in FIG. 2 and FIG. 3, the circuit substrate 26 is a rectangular plate-shaped substrate, and is formed of an electrical insulator such as glass fabric base epoxy resin material. A control circuit 41 for performing signal processing for transmission/reception of the RF signals described above is mounted on the circuit substrate 26. The circuit substrate 26 in the present embodiment has an almost square plate shape. The circuit substrate 26 is fixed to an inner surface **21*b*1 of a bottom portion 21*b* of the housing 21**.

The power feed line 37, which extends from the antenna base 25 via the flexible substrate 28 to the circuit substrate 26, is connected to the control circuit 41. That is, each radiating element 27 is connected to the control circuit 41 via the power feed line 37.

The inner surface **21*b*1 is formed so as to be almost parallel to the aperture plane 23. Thus, the circuit substrate 26 is fixed so as to be almost parallel to the aperture plane 23**.

In addition, the circuit substrate 26 is fixed so as to be almost parallel to a horizontal plane. Therefore, the aperture plane 23 is also almost parallel to the horizontal plane. Here, the horizontal plane refers to the horizontal plane when the vehicle 10 is in a horizontal state.

A connector 42 for connecting the control circuit 41 and the communication device 3 is provided on an outer surface **21*b*2 of the bottom portion 21*b* of the housing 21**.

The flexible substrate 28 is connected to each side end of the circuit substrate 26. Thus, the antenna base 25 is connected to each side end of the circuit substrate 26 via the flexible substrate 28.

The antenna base 25 is inclined relative to the circuit substrate 26 by the flexible substrate 28 being bent (flexed).

It is noted that the circuit substrate 26 is fixed almost horizontally when the vehicle 10 is stopped on a horizontal road.

As described above, each antenna base 25 is connected to the circuit substrate 26 via the flexible substrate 28, and thus each antenna base 25 can be inclined using the circuit substrate 26 as a base end.

Each antenna base 25 is fixed to the housing 21 so as to be inclined relative to the aperture plane 23 at which the radome 22 is attached.

The antenna base 25 is fixed via a bracket 43 to an inclined portion **21*c* rising from the edge of the inner surface 21*b*1. The antenna base 25 is fixed to the inclined portion 21*c* so as to be almost parallel to the inclined portion 21*c***.

Thus, the radiation surface **25*a* of each antenna base 25 is inclined relative to the aperture plane 23**.

The respective antenna bases 25 are inclined by being raised in such directions that the radiation surfaces **25*a* thereof face each other, using the respective side ends of the circuit substrate 26 as base ends. Thus, the antenna bases 25** are inclined in directions different from each other.

The state where the antenna bases 25 are inclined in directions different from each other refers to a state where the normal directions of the antenna bases 25 described later are different from each other.

Thus, since the bendable flexible substrate 28 is provided on the base end side of each antenna base 25, the radiation surfaces **25*a* of the antenna bases 25 can be easily inclined as compared to the case where, for example, the radiating elements 27 of the antenna base 25 are mounted to the circuit substrate 26 and thus the antenna base 25 and the circuit substrate 26** are integrally formed.

In addition, the respective antenna bases 25 are fixed in an inclined state such that the normal directions of the radiation surfaces **25*a* cross each other on the radiation surface 25*a* side. Thus, the radiation surface 25*a* of each antenna base 25 faces in one of the four directions, that is, front, rear, right, and left, around the circuit substrate 26**, in terms of horizontal plane direction, and faces obliquely upward relative to the horizontal direction, in terms of vertical plane direction.

Thus, the antenna module 4 can adapt to orientation directions in a shared manner with the antenna bases 25 in terms of horizontal plane direction, and the radiation surfaces **25*a* of the antenna bases 25 face obliquely upward in terms of vertical plane direction, whereby the orientation direction can be directed toward the base station 2** provided at a high location.

It is noted that the normal direction of the radiation surface **25*a* refers to a direction orthogonal to the radiation surface 25*a***.

Figure 5A:
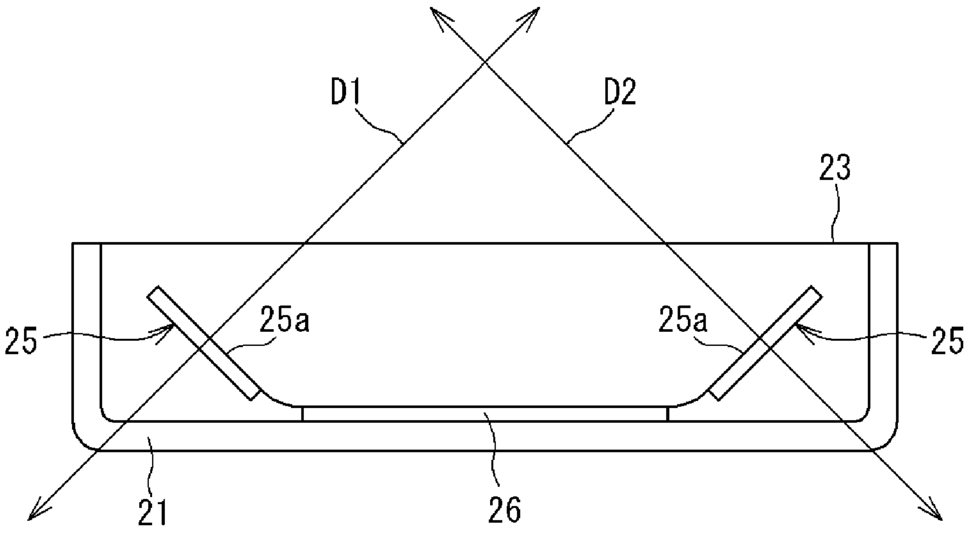
FIG. 5A is a diagram illustrating normal directions of radiation surfaces and shows arrangement of antenna bases 25 in the first embodiment.
Figure 5B:
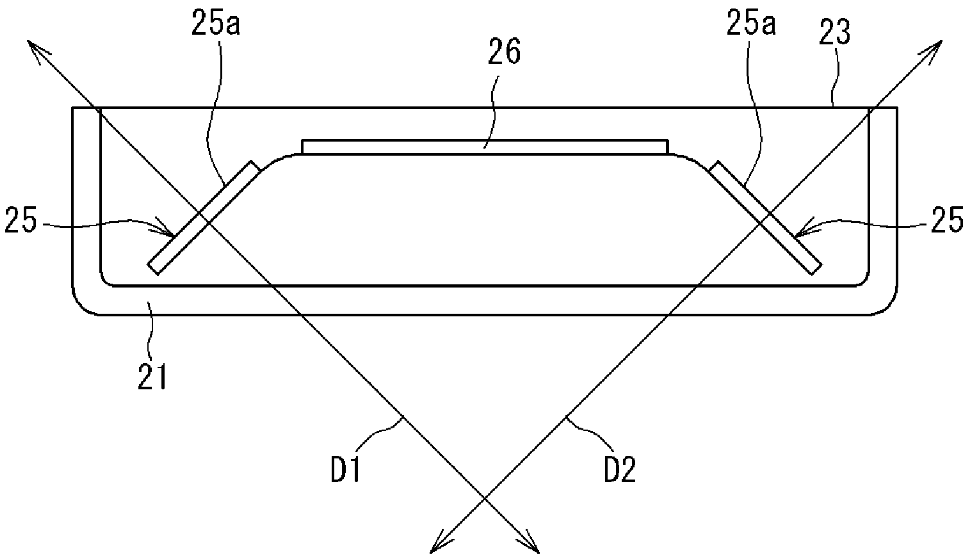
FIG. 5B is a diagram illustrating normal directions of radiation surfaces and shows another example of arrangement of antenna bases.

FIG. 5A and FIG. 5B are views illustrating the normal directions of the radiation surfaces. FIG. 5A shows the arrangement of the antenna bases 25 in the present embodiment.

As shown in FIG. 5A, each antenna base 25 in the present embodiment is inclined such that the radiation surface **25*a* faces toward the center side of the aperture plane 23**.

Thus, a normal direction D1 of one antenna base 25 (left side in the drawing) and a normal direction D2 of another antenna base 25 (right side in the drawing) cross each other on the radiation surface **25*a*** side.

That is, one antenna base 25 and another antenna base 25 are inclined such that their beams (orientation directions) cross each other.

FIG. 5B shows another example of the arrangement of the antenna bases 25.

In FIG. 5B, each antenna base 25 is inclined such that the radiation surface **25*a* faces toward the side opposite to the center side of the aperture plane 23**.

Thus, a normal direction D1 of one antenna base 25 (left side in the drawing) and a normal direction D2 of another antenna base 25 (right side in the drawing) cross each other on the side opposite to the radiation surface **25*a*** side.

That is, in FIG. 5B, one antenna base 25 and another antenna base 25 are inclined such that their beams (orientation directions) do not cross each other.

In FIG. 5A and FIG. 5B, the cases where the antenna bases 25 are arranged so as to be opposed to each other with the circuit substrate 26 therebetween have been described. However, the same applies to the case where the antenna bases 25 are arranged so as to be adjacent to each other on the circuit substrate 26.

Each antenna base 25 in the present embodiment is capable of beamforming as described above. In addition, the control circuit 41 has a function of, on the basis of radio waves received from the base station 2, detecting an arrival direction of the radio waves, and, on the basis of the detected arrival direction, controlling the direction of a beam.

Here, since the antenna module 4 is embedded relative to the surface of the exterior body panel 11, the vertical plane direction of a beam formed by the radiation surface **25*a* of each antenna base 25 needs to be directed upward relative to the horizontal direction in order to avoid the antenna base 25** and the end edge portion 21*d* of the housing 21 opposed thereto across the circuit substrate 26.

Moreover, when radio waves radiated from each antenna base 25 pass through the vicinity of the outer plate 13, the energy of the radio waves is impaired by the outer plate 13, which is a magnetic material and an electric conductor.

Figure 6A:
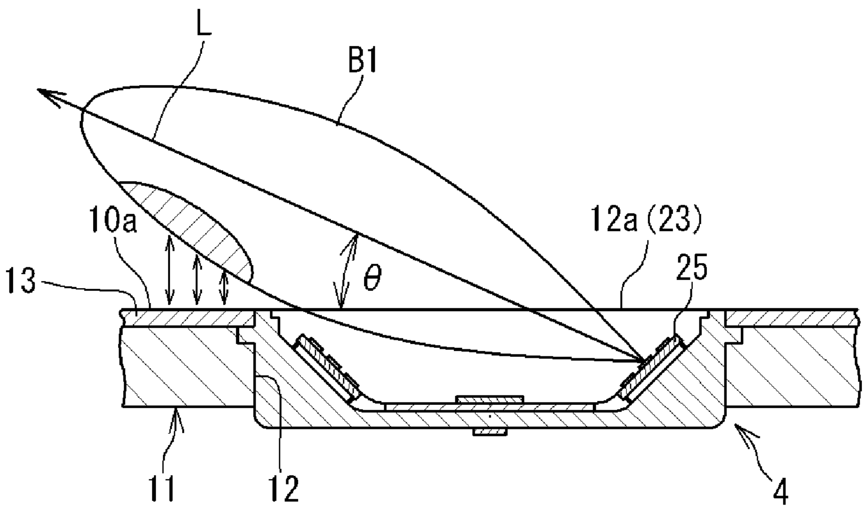
FIG. 6A is a diagram showing an example of a beam by radio waves radiated from an antenna base.

FIG. 6A is a diagram showing an example of a beam formed by the antenna base 25.

As shown in FIG. 6A, a beam B1 by the antenna base 25 approaches the outer plate 13 when a crossing angle θ between an orientation direction L of the beam B1 and an aperture plane 12*a* of the aperture 12 (aperture plane 23 of the housing 21) becomes smaller. The orientation direction of the beam refers to the direction in which the beam intensity of the beam is the highest. The crossing angle refers to the angle at which the orientation direction of the beam by the antenna base 25 or an arrival direction of reception waves cross the aperture plane 12*a*.

When the beam B1 approaches the outer plate 13, the energy of the radio waves radiated from the antenna base 25 is impaired by the radio waves passing through the vicinity of the outer plate 13.

Therefore, for example, the beam in a region R (hatched portion), facing the outer plate 13, of the beam B1 in FIG. 6A is deformed.

Figure 6B:
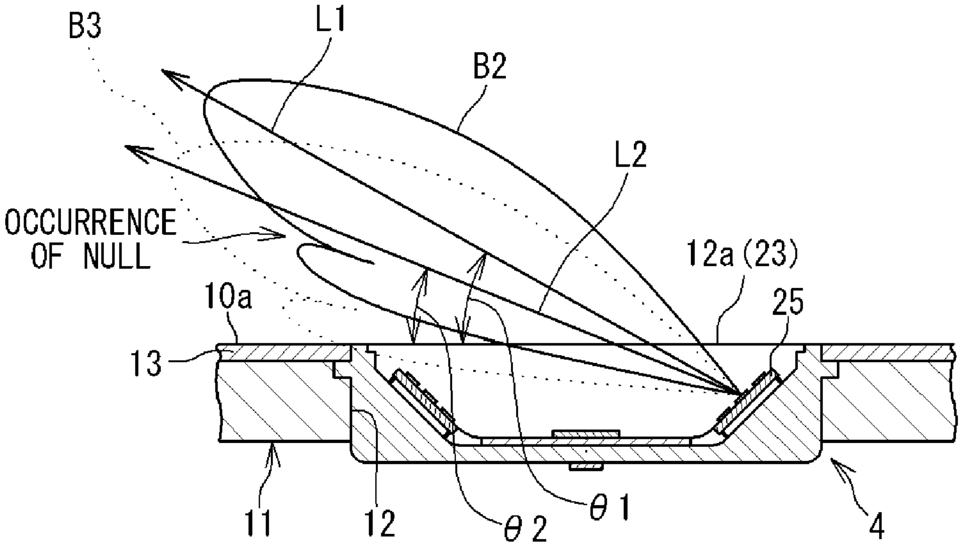
FIG. 6B is a diagram showing an example of a deformed beam.

FIG. 6B is a diagram showing an example of a deformed beam. In FIG. 6B, a beam B2 is deformed due to impairment of the energy of radio waves having passed through the vicinity of the outer plate 13, so that null occurs near the outer plate 13. Therefore, in the beam B2, the gain is partially decreased.

The antenna module 4 according to the present embodiment has a function of correcting the orientation direction of the beam by the antenna base 25 when the crossing angle θ between the orientation direction of the beam and the aperture plane 12*a* is smaller than a predetermined value.

For example, when it is determined that a beam should be formed toward an orientation direction L1 assuming that null occurs as shown in FIG. 6B, the antenna module 4 corrects the orientation direction of the beam such that a beam B3 directed toward an orientation direction L2 that is set to have a crossing angle smaller than that of the beam B2 is formed.

Accordingly, in the beam B2, the deformed part can be compensated for, and a partial decrease in gain can be inhibited.

Figure 7:
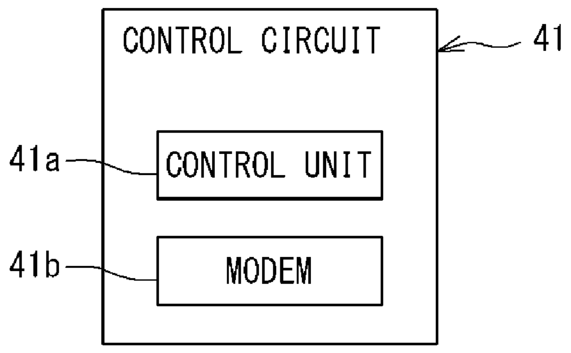
FIG. 7 is a function block diagram of a control circuit.

FIG. 7 is a function block diagram of the control circuit 41.

As shown in FIG. 7, the control circuit 41 includes a control unit 41*a* and a modem 41*b*.

The modem 41*b* has a function of demodulating reception waves from the base station 2 received by the radiating elements 27 of each antenna base 25 and providing intensity information indicating the reception intensity of each radiating element 27 to the control unit 41*a*.

The control unit 41*a* is a computer including a processor and a storage unit, and has a function of controlling the orientation direction of a beam such that the orientation direction of the beam is directed toward the base station 2, on the basis of the intensity information provided by the modem 41*b*.

The control circuit 41 includes a phase shifter capable of individually adjusting the phases of signals transmitted and received by the radiating elements 27 of each antenna base 25. The control unit 41*a* controls the orientation direction of a beam by controlling the phase shifter.

The control unit 41*a* performs a correction process for correcting the orientation direction of a beam when controlling the orientation direction of the beam.

Figure 8:
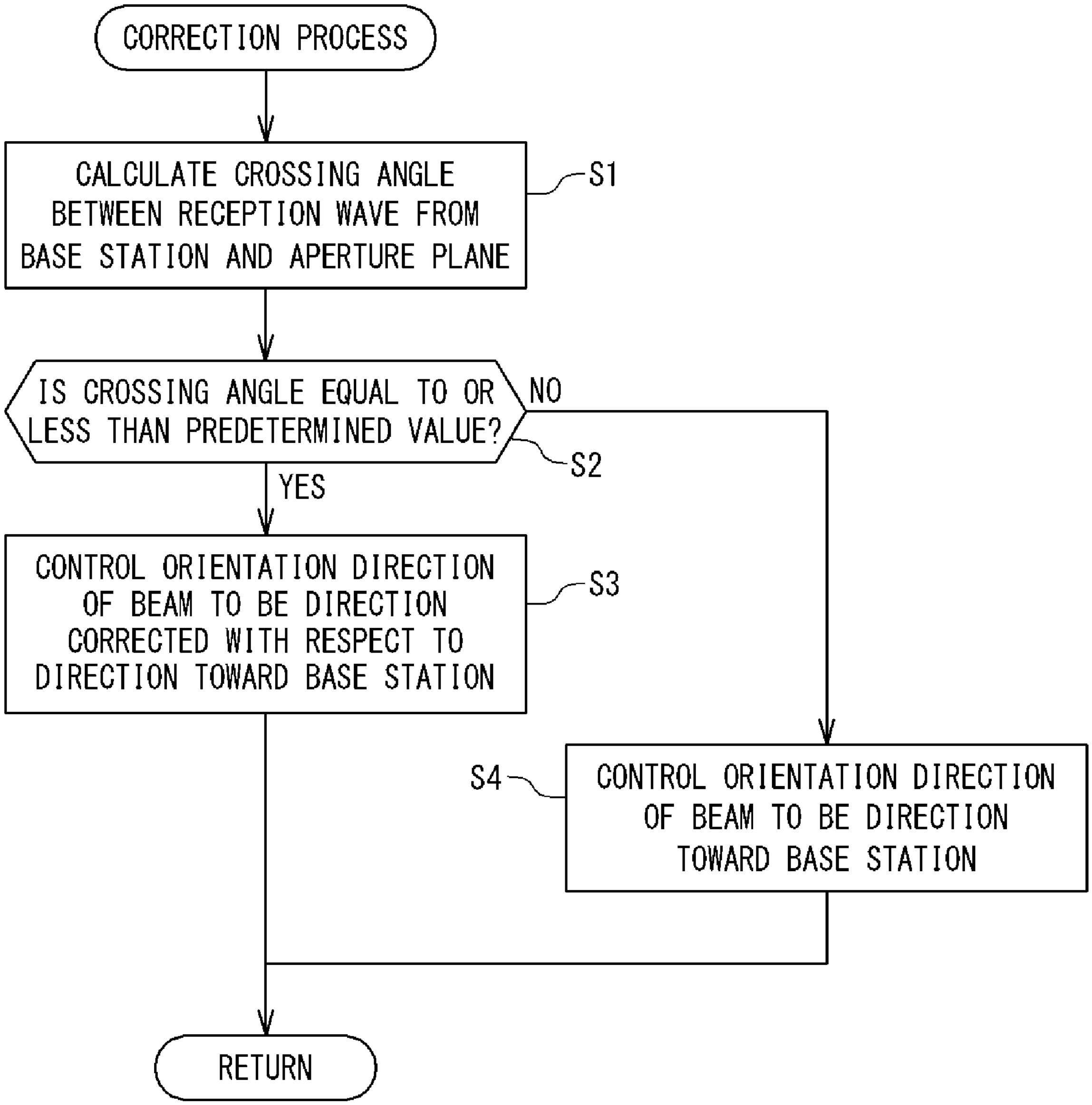
FIG. 8 is a flowchart showing an example of a correction process.

FIG. 8 is a flowchart showing an example of the correction process.

First, the control unit 41*a* specifies an arrival direction of reception waves from the base station 2 on the basis of intensity information, and calculates a crossing angle between the arrival direction of the reception waves and the aperture plane 12*a* (step S1). The intensity information including the relative relationship of the reception intensity of each radiating element 27 indicates the arrival direction of the reception waves from the base station 2. Thus, the control unit 41*a* can specify the arrival direction of the reception waves from the base station 2 on the basis of the intensity information.

Next, the control unit 41*a* determines whether the crossing angle of the reception waves from the base station 2 is equal to or less than a predetermined value (step S2).

When the control unit 41*a* determines that the crossing angle of the reception waves from the base station 2 is not equal to or less than the predetermined value in step S2, the control unit 41*a* proceeds to step S4, and controls the orientation direction of a beam such that the orientation direction of the beam is directed toward the base station 2, on the basis of the intensity information (step S4).

On the other hand, when the control unit 41*a* determines that the crossing angle of the reception waves from the base station 2 is equal to or less than the predetermined value in step S2, the control unit 41*a* proceeds to step S3, and controls the orientation direction of the beam such that the orientation direction of the beam is directed toward a direction corrected with respect to the direction toward the base station 2 obtained on the basis of the intensity information (step S3).

In step S3, the control unit 41*a* corrects the orientation direction of the beam such that a beam having a crossing angle smaller than the crossing angle between the orientation direction of the beam directed toward the base station 2 at present and the aperture plane 12*a* is formed.

For example, it is assumed that, when it is determined in step S2 that the crossing angle of the reception waves from the base station 2 is equal to or less than the predetermined value, the orientation direction L1 in FIG. 6B is the orientation direction of the beam B2 directed toward the base station 2.

At this time, the control unit 41*a* performs control such that the beam B3 with the orientation direction L2 having a crossing angle θ2 smaller than a crossing angle θ1 of the beam B2 directed toward the base station 2 is formed.

The predetermined value in step S2 is set to a crossing angle at which the beam becomes deformed and a decrease in gain begins to occur.

In addition, the amount of correction for the crossing angle of the beam by the control unit 41*a* is obtained in advance by simulation with a computer or the like.

As described above, the control unit 41*a* corrects the orientation direction of the beam in accordance with the crossing angle of the reception waves from the base station 2.

Accordingly, even when the crossing angle of the orientation direction of the beam becomes smaller and the beam approaches the outer plate 13 so that the beam becomes deformed, a partial decrease in gain can be inhibited by correcting the orientation direction of the beam so as to compensate for the deformation of the beam.

In the present embodiment, the case of correcting the orientation direction of the beam when the crossing angle of the reception waves from the base station 2 is equal to or less than the predetermined value has been described as an example. However, for example, the amount of correction for the orientation direction of the beam may be changed in accordance with the crossing angle of the reception waves from the base station 2 such that the amount of correction is increased as the crossing angle of the reception waves from the base station 2 becomes smaller.

Second Embodiment

Figure 9:
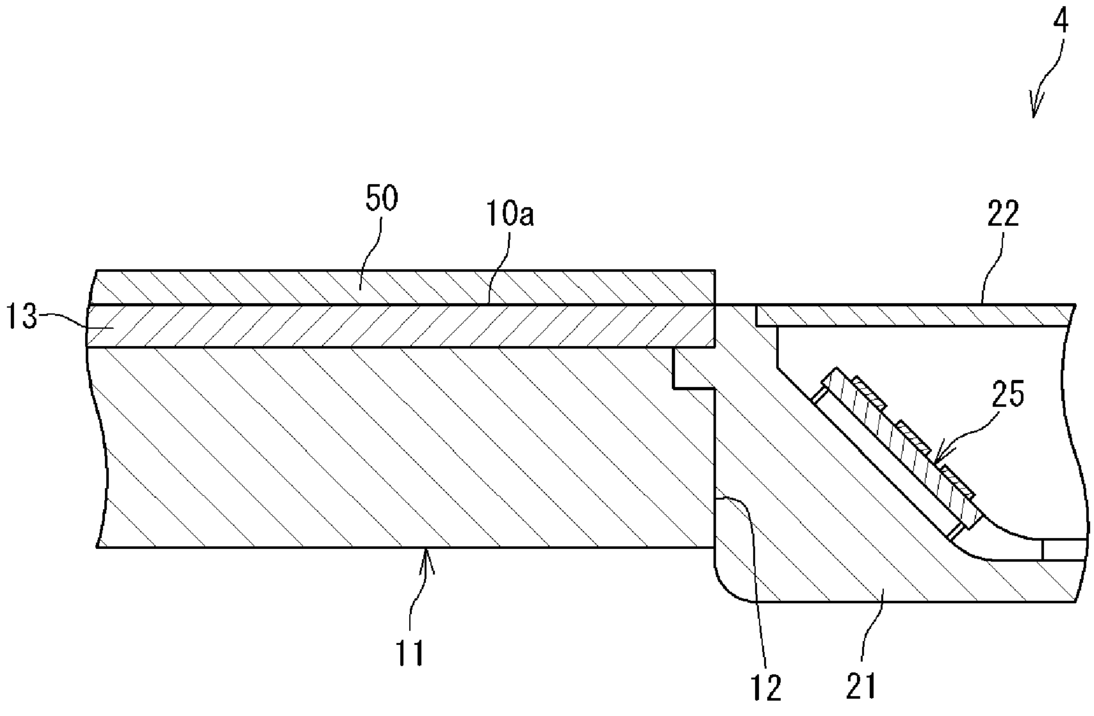
FIG. 9 is a partial cross-sectional view of an antenna module according to a second embodiment.
Figure 10:
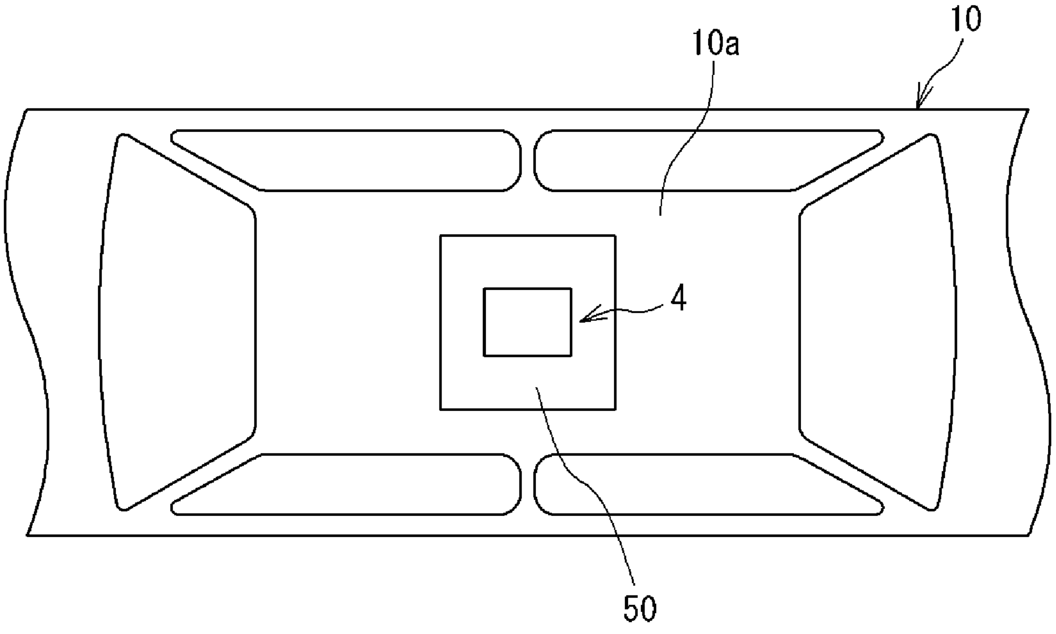
FIG. 10 is a top view of a vehicle.

FIG. 9 is a partial cross-sectional view of an antenna module 4 according to a second embodiment, and FIG. 10 is a top view of a vehicle 10.

The present embodiment is different from the first embodiment in that a shielding portion 50 is provided on the outer surface 10*a* of the vehicle 10.

The shielding portion 50 is a sheet-like member, and is formed in a rectangular shape. The shielding portion 50 is composed of, for example, a radio wave absorbing sheet.

The shielding portion 50 is laminated on the outer surface 10*a* of the vehicle 10. The shielding portion 50 is laminated at the peripheral edge of the aperture 12 and provided so as to surround the aperture 12. That is, the shielding portion 50 is provided so as to surround the periphery of the aperture 12 in the outer surface of the exterior body panel 11 (outer plate 13).

Accordingly, the shielding portion 50 electrically and magnetically shields the outer plate 13 and the radio waves radiated from the antenna base 25 from each other.

With this shielding portion 50, when the radio waves pass through the vicinity of the outer plate 13, the energy of the radio waves can be inhibited from being impaired, and the beam can be inhibited from being deformed.

In the present embodiment, the case where the shielding portion 50 is composed of a radio wave absorbing sheet has been described as an example, but a sheet material composed of an electrical insulator such as resin or rubber may be used. In this case as well, the outer plate 13 and the radio waves radiated from the antenna base 25 can be electrically and magnetically shielded from each other.

Moreover, the shielding portion 50 in the present embodiment is provided so as to cover a part of the outer surface 10*a* in the roof of the vehicle 10 including the peripheral edge of the aperture 12. However, it is sufficient that the shielding portion 50 is provided at least in a range of the outer surface 10*a* that causes deformation of the beam, and the shielding portion 50 may be provided so as to shield the entire roof.

Third Embodiment

Figure 11:
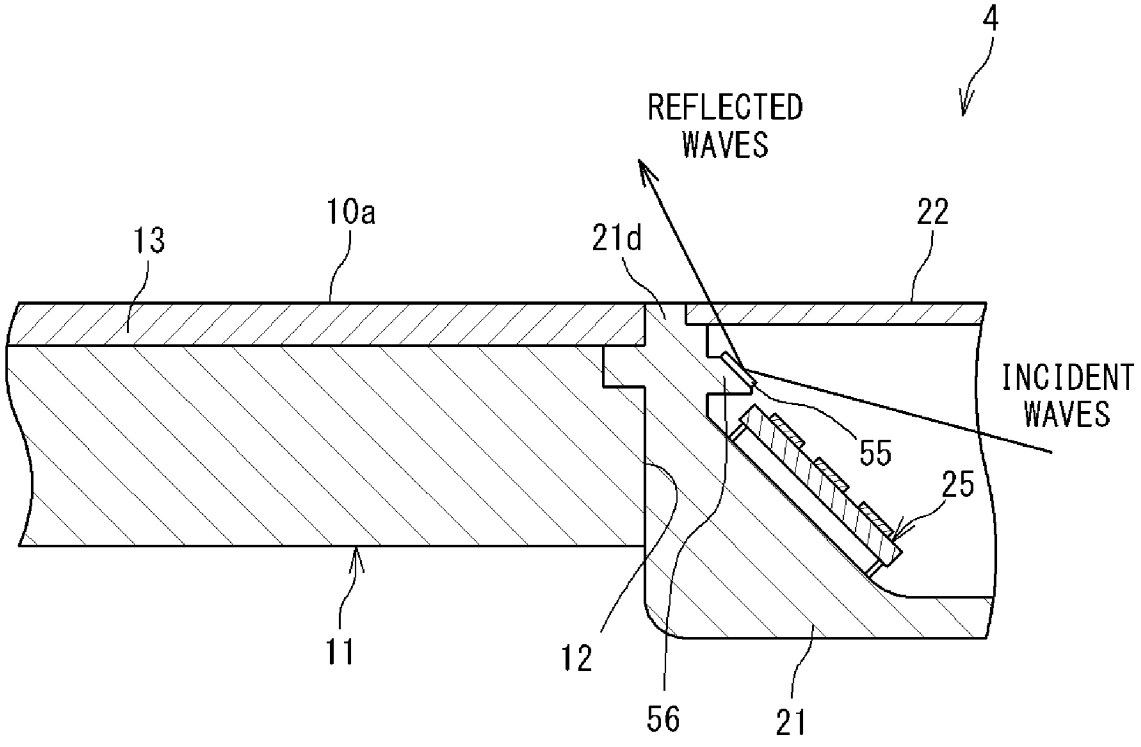
FIG. 11 is a partial cross-sectional view of an antenna module according to a third embodiment.

FIG. 11 is a partial cross-sectional view of an antenna module 4 according to a third embodiment.

The antenna module 4 according to the present embodiment is different from the first embodiment in that the antenna module 4 includes a guide portion 55.

The guide portion 55 is a reflection element that reflects radio waves, and is provided at the end edge portion 21*d* of the housing 21, which is the inner end (inner end surface) of the aperture 12. A projection 56 for holding the guide portion 55 is formed on the inner surface of the end edge portion 21*d*. The guide portion 55 is disposed above each antenna base 25 along the longitudinal direction of the antenna base 25.

When transmission waves from the antenna base 25 disposed so as to be opposed to the guide portion 55 across the circuit substrate 26 are incident on the guide portion 55, the guide portion 55 reflects the incident transmission waves toward the outside of the vehicle 10.

As shown in FIG. 11, the guide portion 55 reflects transmission waves (incident waves) emitted toward the end edge portion 21*d*, to bend the emission path of the transmission waves such that the transmission waves are not applied to the end edge portion 21*d*, thereby guiding the transmission waves to the outside of the vehicle 10.

Since the antenna module 4 is embedded relative to the surface of the exterior body panel 11, the transmission waves radiated from the antenna base 25 may be applied to the end edge portion 21*d* of the housing 21 opposed thereto across the circuit substrate 26.

When the transmission waves are radiated to the end edge portion 21*d* of the housing 21, the transmission waves may be reflected in an unintended direction such as to the inside of the housing 21, and the beam may become deformed, which may cause a decrease in gain.

In this regard, in the present embodiment, since the guide portion 55 composed of a reflection element is provided at the end edge portion 21*d* of the housing 21 which is the inner end of the aperture 12, the transmission waves that may be radiated to the inner end of the aperture 12 and radiated in an unintended direction can be radiated to the vehicle outside. As a result, the beam can be inhibited from being deformed.

In the present embodiment, the case where the guide portion 55 is composed of a reflection element has been described as an example, but, for example, an element made of a metamaterial capable of guiding incident electromagnetic waves in a desired direction may be used. In this case as well, the beam can be inhibited from being deformed.

The metamaterial is, for example, an artificial substance in which cells that are sufficiently smaller than the wavelength of electromagnetic waves are periodically arranged and the physical property values for electromagnetic waves can be adjusted.

Fourth Embodiment

Figure 12:
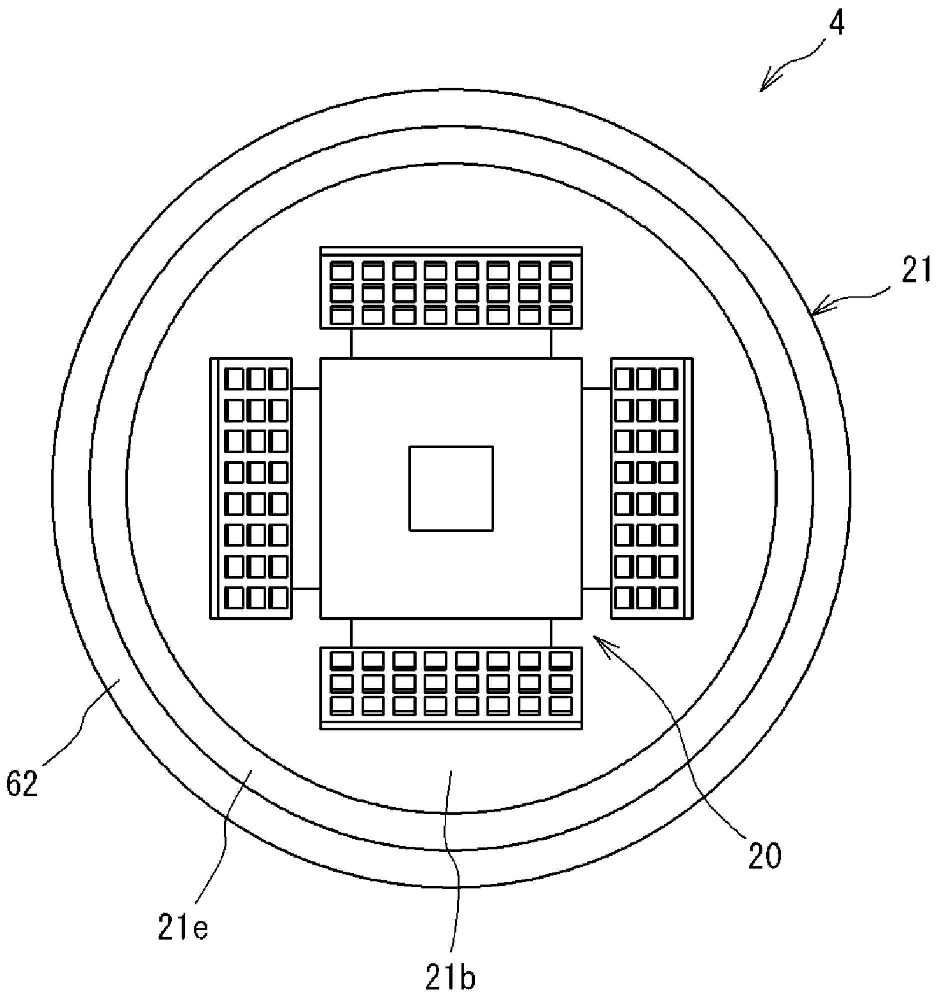
FIG. 12 is a top view of an antenna module according to a fourth embodiment.

FIG. 12 is a top view of an antenna module 4 according to a fourth embodiment.

The present embodiment is different from the first embodiment in that the bottom portion 21*b* of the housing 21 is formed in a disk shape and the entire housing 21 is formed in a circular shape.

The housing 21 in the present embodiment is formed to include: a disk-shaped bottom portion 21*b* to which the module body 20 is fixed; and a cylindrical side wall portion 21*e* erected from the periphery of the bottom portion 21*b*.

Figure 13:
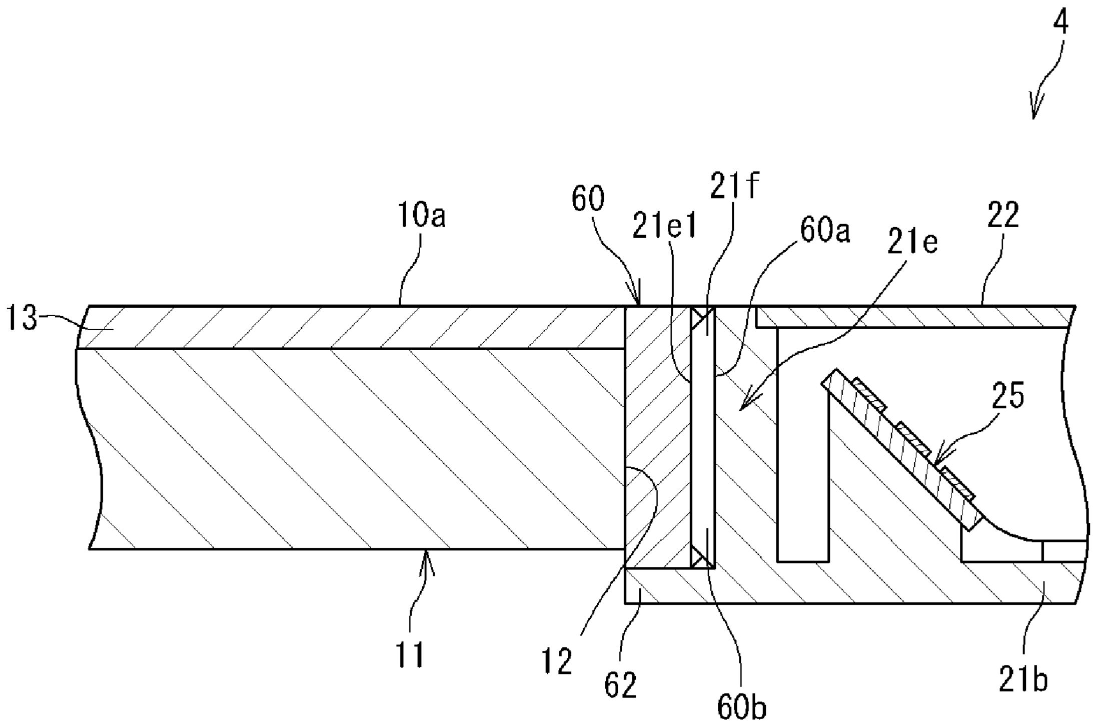
FIG. 13 is a partial cross-sectional view of the antenna module according to the fourth embodiment.

FIG. 13 is a partial cross-sectional view of the antenna module 4 according to the present embodiment.

The aperture 12 in the present embodiment is formed in a circular shape corresponding to the housing 21.

A cylindrical fixing sleeve 60 into which the housing 21 is fixed is inserted and fixed to the inner peripheral surface of the aperture 12.

A female thread 60*b* is formed on an inner peripheral surface 60*a* of the fixing sleeve 60.

A male thread 21*f* to be screwed into the female thread 60*b* of the fixing sleeve 60 is formed on an outer peripheral surface 21*e*1 of the side wall portion 21*e* of the housing 21.

The housing 21 is fixed in the fixing sleeve 60 and fixed to the exterior body panel 11 by screwing the male thread 21*f* into the female thread 60*b* of the fixing sleeve 60.

That is, the male thread 21*f* forms a fixing mechanism, provided on the outer peripheral surface 21*e*1 of the side wall portion 21*e*, for fixing the housing 21 to the fixing sleeve 60.

Moreover, an annular projection 62 is formed on the bottom portion 21*b* side of the side wall portion 21*e* so as to project radially outward. The annular projection 62 is in contact with an end surface of the fixing sleeve 60 in a state where the housing 21 is fixed to the exterior body panel 11.

Thus, the housing 21 is screwed into the fixing sleeve 60 from the vehicle inside to be fixed thereto. In addition, at this time, the annular projection 62 serves as a stopper for axially positioning the housing 21 relative to the fixing sleeve 60.

As described above, in the antenna module 4 according to the present embodiment, the housing 21 can be easily fixed to the exterior body panel 11 with a simple configuration.

In the present embodiment, the case where the male thread 21*f* is provided as a fixing mechanism, provided on the outer peripheral surface 21*e*1 of the side wall portion 21*e*, for fixing the housing 21 to the fixing sleeve 60, has been described as an example. However, as long as the fixing mechanism can fix the housing 21 to the fixing sleeve 60, the fixing mechanism does not have to be a thread, and, for example, a projection to be engaged with a hole provided in the inner peripheral surface of the fixing sleeve 60 or with the lower end surface of the fixing sleeve 60 may be provided, as the fixing mechanism, so as to project radially outward from the side wall portion 21*e*.

Figure 14:
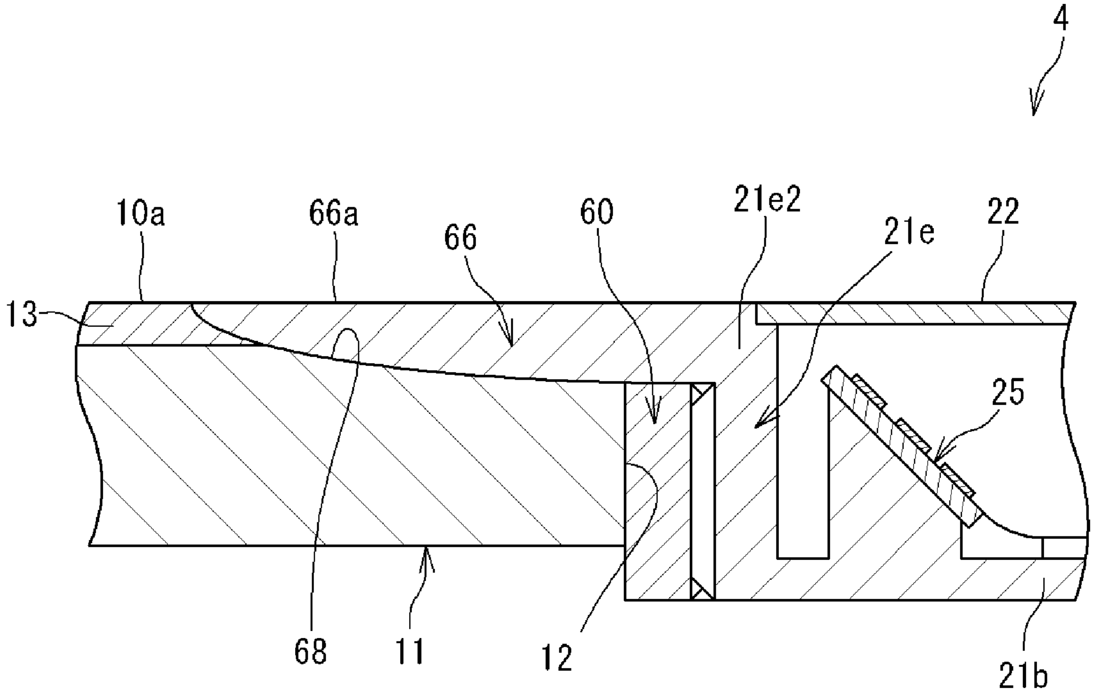
FIG. 14 is a partial cross-sectional view of an antenna module according to a modification of the fourth embodiment.

FIG. 14 is a partial cross-sectional view of an antenna module 4 according to a modification of the fourth embodiment.

In the present modification, the annular projection 62 is not provided at the side wall portion 21*e* of the housing 21, and a flange portion 66 is provided at an end edge portion 21*e*2 which is the end of the side wall portion 21*e*.

The flange portion 66 extends radially outward and is formed in an annular shape. The flange portion 66 is in contact with the exterior body panel 11 from the outside of the vehicle 10 in a state where the housing 21 is fixed to the fixing sleeve 60.

A recess 68 is formed on the exterior body panel 11 so as to be recessed to match the shape of the flange portion 66. An outer surface 66*a* of the flange portion 66 which is a part of the outer side of the vehicle 10 is formed so as to be flush with the outer surface 10*a* of the vehicle 10 (the outer surface of the outer plate 13) when the flange portion 66 is in contact with the recess 68.

In the present modification, the housing 21 is screwed into the fixing sleeve 60 from the vehicle outside to be fixed thereto. In addition, at this time, the flange portion 66 serves as a stopper for axially positioning the housing 21 relative to the fixing sleeve 60.

Figure 15:
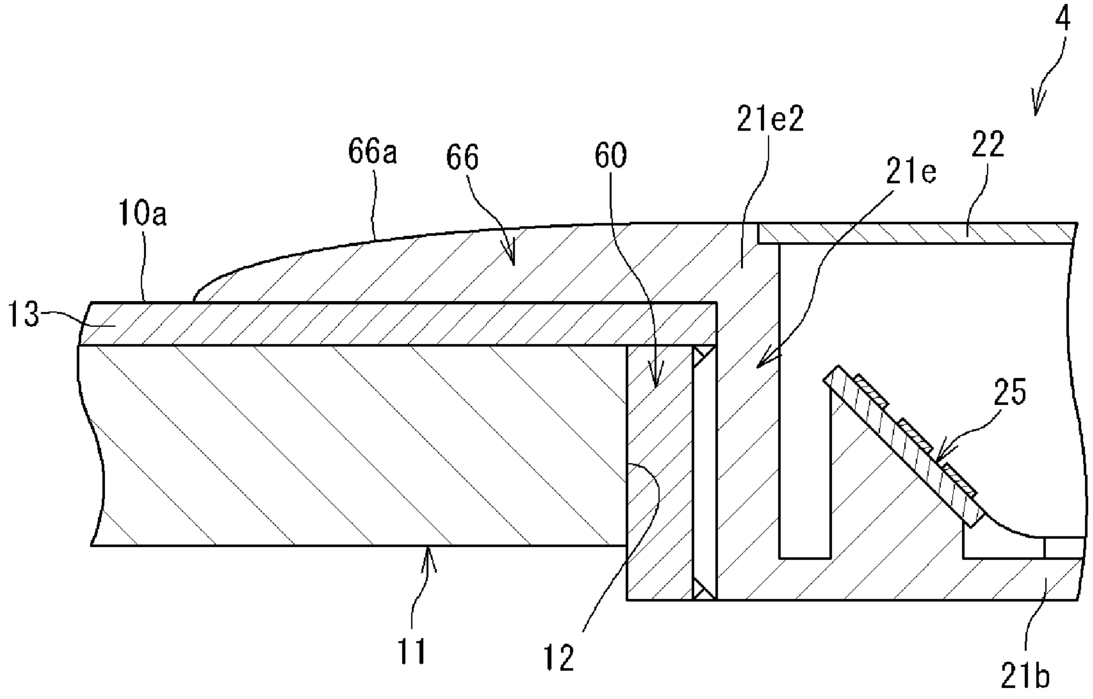
FIG. 15 is a partial cross-sectional view of an antenna module according to another modification of the fourth embodiment.

FIG. 15 is a partial cross-sectional view of an antenna module 4 according to another modification of the fourth embodiment.

In the present modification, the recess 68 is not formed on the exterior body panel 11, and the flange portion 66 is in contact with the outer surface 10*a* of the vehicle 10.

The flange portion 66 is formed so as to be tapered toward a radial end portion thereof, and thus the outer surface 66*a* is smoothly connected to the outer surface 10*a*.

In this case as well, the housing 21 is screwed into the fixing sleeve 60 from the outside of the vehicle 10 to be fixed thereto. In addition, the flange portion 66 serves as a stopper for axially positioning the housing 21 relative to the fixing sleeve 60.

Moreover, in the present modification, since the flange portion 66 covers the outer plate 13, for example, when the flange portion 66 is formed of an electrical insulator such as resin, the flange portion 66 can serve as the shielding portion 50 which electrically and magnetically shields the outer plate 13 and the radio waves radiated from the antenna base 25 from each other.

Others

The embodiments disclosed above are merely illustrative in all aspects and should be considered not restrictive.

In the above embodiments, the case where a steel plate is used as the outer plate 13 which forms the outer surface 10*a* of the vehicle has been described as an example. However, the outer plate 13 may be formed of another conductive metal material such as an aluminum alloy.

In the above embodiments, the case where the antenna module 4 is provided at the exterior body panel 11 of the roof of the vehicle 10 has been described as an example. However, the antenna module 4 may be provided at an exterior body panel of another part other than the exterior body panel 11 of the roof, particularly, at a surface that faces upward. For example, in the case of an automobile, the antenna module 4 may be provided at an exterior body panel such as the trunk or the hood.

In the above embodiments, the case where the four antenna bases 25 are provided has been described as an example. However, three antenna bases 25 may be provided or five or more antenna bases 25 may be provided. In this case, the circuit substrate 26 is preferably formed in a polygonal shape in accordance with the number of the antenna bases 25. This is because the antenna bases 25 can be connected to the respective side ends of the circuit substrate 26.

In the above embodiments, the case where the flexible substrate 28 is formed of a bendable dielectric film has been described as an example. However, instead of a dielectric film, the flexible substrate 28 may be composed of a hinge or the like which rotatably connects the circuit substrate 26 and the antenna base 25 and allows power feeding therethrough.

The scope of the present disclosure is defined by the scope of the claims rather than the meaning described above, and is intended to include meaning equivalent to the scope of the claims and all modifications within the scope.

REFERENCE SIGNS LIST

1 on-vehicle communication apparatus
2 base station
3 communication device
4 antenna module
10 vehicle
10*a* outer surface
11 exterior body panel
12 aperture
12*a* aperture plane
13 outer plate
13*a* inner surface
14 lining material
15 projection
20 module body
21 housing

21*a* aperture
21*b* bottom portion
21*b*1 inner surface
21*b*2 outer surface
21*c* inclined portion
21*d* end edge portion
21*e* side wall portion
21*e*1 outer peripheral surface
21*e*2 end edge portion
21*f* male thread
22 radome
22*a* surface
23 aperture plane
25 antenna base
25*a* radiation surface
26 circuit substrate
27 radiating element
28 flexible substrate
29 first dielectric layer
30 second dielectric layer
31 third dielectric layer
32 fourth dielectric layer
33 fifth dielectric layer
34 ground pattern
36 dielectric layer
37 power feed line
38 ground pattern
39 ground pattern
41 control circuit
41*a* control unit
41*b* modem
42 connector
43 bracket
50 shielding portion
55 guide portion
56 projection
60 fixing sleeve
60*a* inner peripheral surface
60*b* female thread
62 annular projection
66 flange portion
66*a* outer surface
68 recess
B beam
B1 beam
B2 beam
B3 beam
D1 normal direction
D2 normal direction
L orientation direction
L1 orientation direction
L2 orientation direction
θ, θ1, θ2 crossing angle

The invention claimed is:

1. An antenna module to be provided to a vehicle, the antenna module comprising:
- an array antenna configured to form a beam directed from an aperture provided in an exterior body panel of the vehicle, toward a vehicle outside; and
- a housing holding the array antenna in a vehicle inside, wherein a plurality of antenna bases of the array antenna are inclined in directions different from each other.

2. The antenna module according to claim 1, wherein
- the exterior body panel includes a metal plate,
- the antenna module further comprises a control unit configured to control an orientation direction of the beam such that the orientation direction of the beam is directed toward a base station that is a transmission source of a reception wave received by the array antenna, and
- the control unit corrects the orientation direction of the beam in accordance with a crossing angle between an arrival direction of the reception wave and an aperture plane of the aperture.

3. The antenna module according to claim 1, further comprising a guide portion provided at an inner end of the aperture and configured to, when a transmission wave radiated from the array antenna is incident thereon, radiate the incident transmission wave toward the vehicle outside.

4. The antenna module according to claim 3, wherein the guide portion includes a reflection element configured to reflect the incident transmission wave toward the vehicle outside.

5. The antenna module according to claim 3, wherein the guide portion includes a metamaterial configured to radiate the incident transmission wave toward the vehicle outside.

6. An antenna module to be provided to a vehicle, the antenna module comprising:
- an array antenna configured to form a beam directed from an aperture provided in an exterior body panel of the vehicle, toward a vehicle outside; and
- a housing holding the array antenna in a vehicle inside, wherein
- the housing includes: a bottom portion to which the array antenna is fixed; and a cylindrical side wall portion erected from the bottom portion,
- a fixing sleeve to which the housing is inserted and fixed is provided at the exterior body panel,
- a fixing mechanism for fixing the housing to the fixing sleeve is provided at the side wall portion
- an annular flange portion extending radially outward is provided at an end of the side wall portion, and
- the flange portion is made of an electrical insulator and overlaps a surrounding portion surrounding the side wall portion on an outer surface of the exterior body panel.

7. A vehicle comprising the antenna module according to claim 1.

8. The vehicle according to claim 7, wherein
- the exterior body panel includes a metal plate, and
- the vehicle further comprises a shielding portion provided so as to cover a periphery of the aperture in the outer surface of the exterior body panel and configured to shield the exterior body panel and a radio wave radiated from the array antenna from each other.

9. The vehicle according to claim 8, wherein the shielding portion includes a radio absorbent material covering the outer surface.

10. The vehicle according to claim 8, wherein the shielding portion includes an electrical insulator covering the outer surface.

* * * * *